United States Patent [19]

Erich, Jr.

[11] 4,302,825
[45] Nov. 24, 1981

[54] ROTATING ECCENTRIC WEIGHT APPARATUS AND METHOD FOR GENERATING CODED SHEAR WAVE SIGNALS

[75] Inventor: Otis G. Erich, Jr., La Mirada, Calif.

[73] Assignee: Union Oil Company of California, Brea, Calif.

[21] Appl. No.: 122,133

[22] Filed: Feb. 19, 1980

Related U.S. Application Data

[63] Continuation-in-part of Ser. No. 956,613, Nov. 1, 1978, Pat. No. 4,234,053, which is a continuation-in-part of Ser. No. 765,799, Feb. 4, 1977, Pat. No. 4,143,737.

[51] Int. Cl.³ .................... G01V 1/36; G01V 1/053; G01V 1/153
[52] U.S. Cl. .................................... 367/41; 367/55; 367/75; 181/121
[58] Field of Search .................... 367/41, 55, 75; 181/121

[56] References Cited

U.S. PATENT DOCUMENTS

| | | | |
|---|---|---|---|
| 3,286,783 | 11/1966 | Cherry et al. | 367/75 |
| 3,302,164 | 1/1967 | Waters et al. | 367/75 |
| 3,583,521 | 6/1971 | Anatey | 181/121 |
| 3,835,954 | 9/1974 | Layotte | 181/121 |
| 4,034,631 | 7/1977 | Murphy | 367/75 |
| 4,059,820 | 11/1977 | Turpening | 367/75 |
| 4,143,737 | 3/1979 | Erich | 181/121 |
| 4,147,228 | 4/1979 | Bouyoucous | 181/121 |
| 4,184,144 | 1/1980 | Rickenbacher | 181/121 |
| 4,223,399 | 9/1980 | Hochett | 367/41 |
| 4,234,053 | 11/1980 | Erich | 367/55 |

FOREIGN PATENT DOCUMENTS

| | | | |
|---|---|---|---|
| 358242 | 4/1941 | Italy | 181/121 |
| 625174 | 9/1978 | U.S.S.R. | 181/121 |
| 672588 | 7/1979 | U.S.S.R. | 181/121 |

OTHER PUBLICATIONS

Heiland, "Geophysical Exploration", 1940, pp. 914-928, Prentice-Hall, Inc.

*Primary Examiner*—Nelson Moskowitz
*Attorney, Agent, or Firm*—Dean Sandford; Daniel R. Farrell

[57] ABSTRACT

A rotating eccentric weight apparatus and method for generating coded shear wave signals for use in seismic exploration. The apparatus includes a rotatable eccentric and a position sensor capable of detecting each instant that the eccentric passes a particular angular position about its axis of rotation and generating a code signal for use in correlating the raw seismic data obtained. In one embodiment, the apparatus includes an outrigger shovel which transmits a sinusoidal shear wave signal generated by the rotating eccentric while the rest of the apparatus is caused to alternately decouple from and impact against the earth surface to transmit a coded train of pressure wave impulses into the earth.

12 Claims, 3 Drawing Figures

ROTATING ECCENTRIC WEIGHT APPARATUS AND METHOD FOR GENERATING CODED SHEAR WAVE SIGNALS

RELATED APPLICATIONS

This is a continuation-in-part of application Ser. No. 956,613, filed Nov. 1, 1978, now U.S. Pat. No. 4,234,053 which is a continuation-in-part of application Ser. No. 765,799, filed Feb. 4, 1977, now U.S. Pat. No. 4,143,737.

BACKGROUND OF THE INVENTION

1. Field of the Invention

This invention relates to the art of geophysical prospecting using artificially induced seismic energy, and more particularly to apparatus and methods for generating shear waves suitable for use in seismic exploration methods.

2. Description of the Prior Art

Two types of seismic signals have been used in the seismic exploration of earth strata. One type is the so-called pressure (P) wave in which the earth particle motion is in the same direction as the wave propagation. Pressure waves are sometimes also called compressional or longitudinal waves. The other type is the shear wave in which the earth particle motion is generally normal to the direction of wave propagation. Shear waves in which the particle motion is oriented normal to the incident plane are called horizontal shear (SH) waves and shear waves in which the particle motion is oriented within the incident plane are called vertical shear (SV) waves.

Pressure waves are the most commonly used signals for seismic exploration and may be generated in numerous ways, such as the detonation of an explosive, the dropping of weights or the use of a mechanical vibrator. My U.S. Pat. No. 4,143,747 and my copending application Ser. No. 956,613 disclose a rotating eccentric weight seismic apparatus and method particularly suited to the generation of pressure waves in relatively inaccessible areas.

Recently, however, there has been an increased interest in the use of shear waves in seismic exploration. U.S. Pat. Nos. 3,286,783 to Cherry et al.; 3,302,164 to Waters et al. 3,372,770 to Clynch; 3,835,954 to Layotte and 4,059,820 to Turpening disclose various apparatus and methods for the generation and use of shear waves in seismic exploration. Heiland, C.A., *Geophysical Exploration*, Prentice-Hall, Inc., 1940, discloses the use of rotating eccentric weight vibrators to generate shear waves.

In the search for petroleum and other valuable resources, it has become the practice to transmit a desired pressure or shear wave signal into the earth from a sourcepoint near the surface of the earth. The reflected and/or refracted energy returning from within the earth to a receiver location is sensed and raw seismic data is recorded. The raw seismic data is mathematically processed and then interpreted to provide an indication of the structure of the underlying strata. In the exploration of onshore regions which are relatively inaccessible to vehicles, the weight of supplies and equipment required determines the practicality of a particular exploration system.

At the present time, a wide variety of seismic exploration systems are available. In some of these systems, a coded energy signal is transmitted into the earth and the raw seismic data which is obtained is correlated with a signature of the coded energy signal. The signature of the coded energy signal must be of very good quality in order to obtain a good quality correlated trace. These coded energy signal systems can be generally classified, according to the method by which the signature used to correlate the raw trace is obtained, as either a master-type or a slave-type source system. In the master-type source systems, the signature used to correlate the raw seismic data is generally sensed as the coded energy signal is transmitted. In the slave-type source systems, the source signature used to correlate the raw seismic data is the predetermined signal which is used to drive the "slave" source during the generation of the coded energy signal.

In the master-type systems disclosed in the prior art, the source signature is typically generated by an acoustic sensor which is responsive to the outgoing seismic signal, such as an accelerometer or a geophone located on or near the seismic wave generator. These master-type systems have generally not been used successfully because the acoustic sensors employed are inherently sensitive to any acoustic energy, including acoustic energy unrelated to the coded energy signal being transmitted. The source signatures generated by these acoustic sensors are often attenuated and/or phase-shifted usually contain significant background interferences. While numerous methods have been proposed to extract the true source code from the output signals generated by acoustic sensors, these methods have been only moderately successful. Accordingly, the quality of the processed traces produced with the prior art master-type coded energy signal systems remains generally unacceptable for high resolution seismic exploration.

On the other hand, the correlated traces obtained by use of the "slave-type" source systems generally have much better resolution. Because the source used in these methods can be made to transmit coded energy signals according to a predetermined code, the code is known and need not be detected by use of an acoustic sensor. Furthermore, carefully preselected coded energy signals which tend to yield high resolution seismic data can be transmitted by precise control of the source. These systems, such as the well known VIBROSEIS ® system developed and licensed by Continental Oil Company, Ponca City, Oklahoma, have been relatively successful. However, the weight of the equipment required, specifically the heavy source control devices and vibrators employed, increases markedly as the resolving power of these systems is enhanced. Moreover, since the VIBROSEIS ® and similar sources must be coupled to the ground, it has been determined that the peak force to weight ratio must be less than 1. These sources are normally vehicle mounted and weigh between about 10 and about 20 tons. Due to this great weight, these "slave-type" source systems are impractical for use in regions not accessible to vehicles.

While the deficiencies of the prior art systems have been largely overcome by the apparatus and method for generating pressure waves disclosed in my U.S. Pat. No. 4,143,737, the apparatus and method disclosed therein are not directly applicable for use in seismic exploration methods using shear waves. Thus, a need exists for a portable apparatus and a method for generating shear waves and obtaining high resolution seismic data with such shear waves.

Accordingly, a primary object of this invention is to provide a portable apparatus and a method for generating shear waves and obtaining high resolution seismic data with such shear waves.

Another object of this invention is to provide an apparatus and method for transmitting coded shear wave signals into the earth and obtaining a code signal for correlation of the resulting seismic data, which code signal is free from the attenuation, phase-shifting and background interferences exemplifying the comparable prior art systems.

Yet another object of this invention is to provide a shear wave generating apparatus and method in which the required weight of the exploration equipment is reduced without sacrificing seismic data quality.

Still another object of this invention is to provide an apparatus and method for simultaneously generating both a multiple impulse pressure wave and a sinusoidal shear wave.

Other objects, advantages and features of this invention will become apparent to those skilled in the art from the following description when taken in conjunction with the drawings.

SUMMARY OF THE INVENTION

Briefly, the apparatus of this invention includes a rotatable eccentric mounted for rotation about an axis of rotation and a position sensor for detecting each instant at which the center of mass of the rotatable eccentric passes that angular position about its axis of rotation at which the peak shear force is developed by the apparatus during each revolution of the rotating eccentric. The apparatus also includes a prime mover adapted to rotate the eccentric about its axis of rotation and, preferably, a device for transmitting shear waves generated by the apparatus into the earth.

In the method of this invention, the shear wave generating apparatus of this invention is positioned at a sourcepoint on the earth surface and the rotatable eccentric and a first sensor element of the position sensor are rotated about an axis of rotation at varying speeds so as to transmit into the earth a shear wave signal having a frequency-variable code. A second sensor element is positioned about the axis of rotation such that the first sensor element passes in close proximity to the second sensor element at and only at the instant at which the center of mass of the rotating eccentric passes that angular position about its axis of rotation at which the apparatus develops its peak shear force during each revolution of the rotatable eccentric. One of the sensor elements, preferably the second sensor element, is caused to generate a code signal characterized by a substantially interference-free background and a plurality of discrete pulses, each of which pulses correspond to one instant at which the first sensor element passes in close proximity to the second sensor element. This code signal is then used to correlate the raw shear wave data obtained.

In one preferred embodiment of this invention, an outrigger shovel is attached to the rotating eccentric weight apparatus and adapted to transmit a sinusoidal shear wave signal into the earth while the rotating eccentric is rotated at a sufficient speed to cause the rest of the apparatus to alternately decouple from and impact against the earth surface to thereby transmit a coded train of pressure wave impulses into the earth. Both shear and pressure wave seismic data is detected and correlated with one or more code signals generated by the position sensor to form a correlated shear wave trace and a correlated pressure wave trace.

BRIEF DESCRIPTION OF THE DRAWINGS

The invention will be more readily understood by reference to the accompanying drawings, wherein like numerals refer to like elements, and in which.

DETAILED DESCRIPTION OF THE INVENTION

Figure 1:
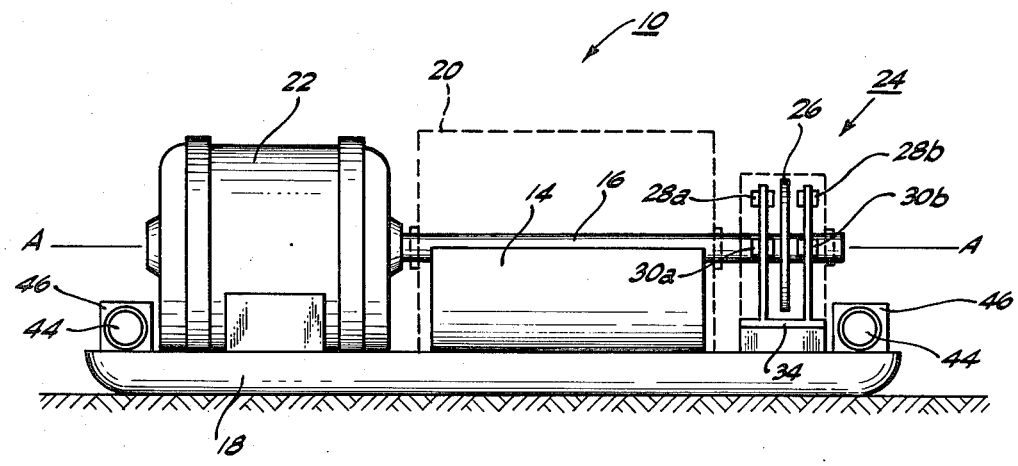
FIGS. 1 and 2 are elevational views of a preferred embodiment of the shear wave generating apparatus of this invention.

The novel shear wave generating apparatus of this invention includes one or more eccentric weights mounted for rotation about an axis of rotation. If more than one rotatable eccentric is employed, they may rotate in unison or may be counter-rotating. A pair or pairs of matched counter-rotating eccentrics are preferred when it is desired to transmit only shear wave signals into the earth. Two or more eccentrics rotating in the same direction about a common axis of rotation or parallel axes of rotation, or a single eccentric rotating about its axis of rotation, are preferred when it is desired to generate both shear wave signals and pressure wave signals.

The shear wave generating apparatus of this invention may be coupled to the earth or only pivotally coupled to the earth, or allowed to alternately decouple fromm and impact against the earth. As used herein, the term "coupled to the earth" means that the apparatus is held in continuous contact with the earth surface, such as by means of hold down weights or anchors. The term "pivotally coupled to the earth" means that the apparatus is in continuous contact with the earth at a pivotal point or along a pivotal line but that portions of the apparatus are allowed to alternately decouple from and impact against the earth. The term "decouple from the earth" means to lift substantially all of the apparatus up out of contact with the earth surface in a manner that inherently results in the subsequent impact of the apparatus against the earth surface. Expressed another way, a decoupling apparatus or a decoupling portion of the apparatus bounces, i.e., its weight-supportive contact with the earth is discontinuous during the period of seismic energy transmission.

Irrespective of the mode of operation selected, a position sensor mounted on the apparatus directly detects the exact instants at which the center of mass of the rotating eccentric passes that particular angular position about its axis of rotation which corresponds to the position at which the peak shear force is developed by the apparatus during each revolution of the rotating eccentric. Where both pressure wave signals and shear wave signals are to be transmitted, the position sensor preferably also directly detects the exact instants at which the center of mass of the rotating eccentric passes that particular angular position about its axis of rotation which corresponds to the position at which the peak earthward force is developed by the apparatus during each revolution of the rotating eccentric.

The force developed by a rotating eccentric is generally perpendicular to its axis of rotation. The force in any particular direction reaches a maximum or peak only once during each revolution of the rotating eccentric. When used as a shear wave generator, a rotating eccentric generates maximum shear forces twice during each revolution of the rotating eccentric but in opposite directions. For the purposes of this invention, one of the shear directions (i.e., one of the two directions which is perpendicular to both the axis of rotation of the eccentric element and the direction of wave propagation) is arbitrarily selected as the "positive" shear direction and the other shear direction is the "negative" shear direction. The selection of one direction over the other is a matter of choice, however the selection is important to positioning of the sensor elements and the processing of the shear wave data. The term "peak shear force" as used herein means the maximum force in the "positive" shear direction during each revolution of the rotating eccentric. Similarly, the term "peak earthward force" as used herein means the maximum force toward the earth during each revolution of the rotating eccentric.

The peak shear force and the peak earthward force developed by the apparatus will each occur once during each revolution of the rotating eccentric, with their magnitude depending upon the rotational speed and eccentric moment of the rotating eccentric. However, for a given rotating eccentric or a given set of rotating eccentrics, the angular position of the eccentric(s) at the instant at which the peak shear force is developed will always be the same, and the angular position of the eccentric(s) at the instant at which the peak earthward force is developed will also be the same. When two or more rotating eccentrics are employed it is possible to shift these angular positions by phase-shifting the eccentrics as described in U.S. Pat. No. 4,143,747, however for any given arrangement the above-described critical angular positions are easily determined.

Although the axis of rotation of the rotating eccentric of the apparatus of this invention can be arranged in any plane, the energy of the seismic pressure waves transmitted by the apparatus will be maximized by positioning the source such that the axis of rotation is perpendicular to the desired direction of wave propagation. Also the energy of the horizontal shear waves generated will be maximized by positioning the source such that the axis of rotation is perpendicular to both the desired direction of wave propagation and an imaginary line drawn from the sourcepoint (i.e., the location of the source) and the receiver location (i.e., the location of the geophones or other receivers used to detect the reflected and/or refracted seismic waves). To maximize the energy of the vertical shear waves generated, the axis of rotation should be perpendicular to the direction of wave propagation and parallel to an imaginary line between the sourcepoint and the receiver location. It is preferred to maximize the energy of the pressure waves and the horizontal shear waves. Accordingly, for the exploration of earth strata underlying a horizontal earth surface the axis of rotation of the rotatable eccentric is preferably substantially horizontal and perpendicular to an imaginary line drawn from the sourcepoint to the receiver location.

The position sensors used in this invention include magnetic, optical and/or electrical devices which are known in the sensing art. The position sensor is comprised of at least two sensor elements, one being an "actuator" and the other being a "pulse generator" which generates a discrete pulse at each instant that the actuator passes in close proximity to the pulse generator. The actuator and the pulse generator are mounted on the apparatus so that one of these sensor elements, normally the actuator, is rotated about an axis of rotation at the same speed as the rotatable eccentric is rotated about its axis of rotation and the second sensor element, normally the pulse generator, is mounted on the apparatus at a selected position so that the rotating sensor element passes in close proximity to the second sensor element at and only at the instant at which the center of mass of the rotating eccentric passes that particular angular position about its axis of rotation at which the peak shear force is developed by the source during each revolution of the rotating eccentric. The rotating element can be mounted on the rotating eccentric or, for example, on a wheel, gear, disk or arm which is rotated at the same speed as the eccentric element. Since rotating the rotatable sensor element about an axis other than the axis of rotation of the rotatable eccentric is the practical equivalent of rotating both the sensor element and the eccentric about a single axis of rotaion, it is intended to include all such practical equivalents wherever in this specification and the appended claims the rotation of both the eccentric and the rotatable sensor element about a common axis of rotation is described.

Where it is desired to use both pressure wave signals and shear wave signals to produce pressure wave traces and shear wave traces, it is preferred that the position sensor include at least a third sensor element, generally another pulse generator, which cooperates with either the first or the second sensor elements just described to generate a pressure wave code signal characterized by a substantially interference-free background and a plurality of discrete pulses, each of which pulses corresponds to one of the instants at which the third sensor element is in close proximity to the cooperating one of the first or second sensor elements. Preferably, the third sensor element is a pulse generator which is mounted on the apparatus so that the rotating actuator passes in close proximity to the third sensor element at and only at the instant at which the center of mass of the rotating eccentric passes that particular angular position about its axis of rotation at which the peak earthward force is developed by the source during each revolution of the rotating eccentric.

Position sensors suitable for use in this invention are those which emit a pulse or small wavelet in response to a desired stimulus, but which are relatively insensitive to background interferences including vibrations, sounds, radio signals and ground noises. Suitable position sensors include: optical sensors, comprising a light emitting or transmitting actuator and a photocell pulse generator; electrical sensors, comprising for example a metal contact actuator which completes the otherwise open circuit of the electrical pulse generator, thereby allowing a current to flow; and magnetic sensors, comprising a metal protrusion, or preferably a magnet, actuator and a pulse generator comprising an electric wire coiled around either a magnet or a metal pole piece in a magnetic field, in which coil an electric current is induced by the movement of the actuator past the pulse generator. Optical and magnetic position sensors are preferred because they are more durable and require less maintenance. A wide variety of suitable magnetic sensors are available from the Electro Corporation of Sarasota, Florida, and others. Suitable optical position sensors are available from Datametrics, Inc. of Wilmington, Massachusetts, and others. Several exemplary position sensors are disclosed in U.S. Pat. No. 4,143,737 and my copending application Ser. No. 956,613, now U.S. Pat. No. 4,234,053 the disclosures of which are herein incorporated by reference.

As used herein, the term "master-type source system" means a seismic exploration system in which the seismic data obtained is correlated with a source signature obtained by sensing or monitoring the outgoing seismic signal or some other characteristic of the seismic source, as opposed to "slave-type source systems" in which the seismic data obtained is correlated with the predetermined source code by which the source was driven to generate the coded energy signal. The preferred sources for exploration of relatively inaccessible regions are manually controlled sources, although sources which generate energy in response to a master controller, such as a programmed minicomputer, can be used.

Figure 2:
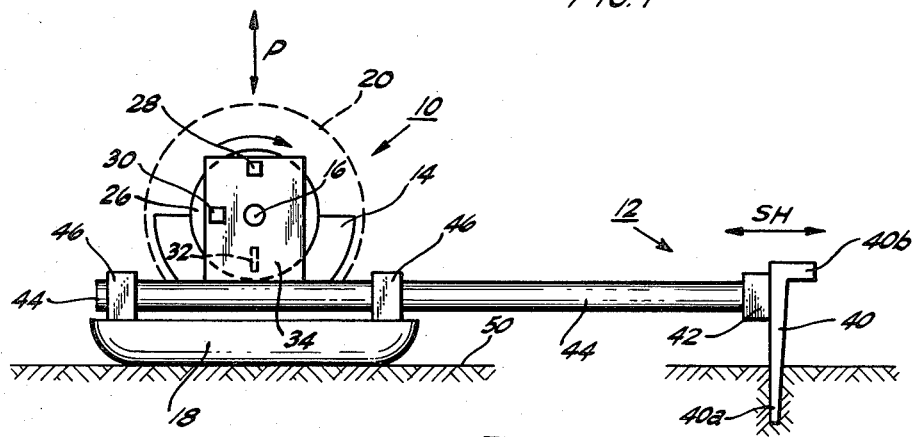

FIGS. 1 and 2 illustrate one preferred embodiment of the apparatus of this invention employing a single rotatable eccentric. The apparatus comprises a major body section, indicated generally as 10, and, optionally, an outrigger section, indicated generally as 12. Body section 10 includes rotatable eccentric 14 comprised of a solid semicylindrical weight fixedly attached to axle 16 which is rotatably supported above and parallel to the bottom surface of base plate 18 by means of bearings or the like, not shown, mounted in a housing, the outline of which is indicated by dashed line 20. The center of mass of eccentric 14 is spaced from and rotatable about an axis of rotation, indicated by line A—A, coincident with the center line of axle 16.

Prime mover 22 is mounted on base plate 18 and is operably connected to axle 16 so as to rotate eccentric 14 and axle 16 about axis A—A at varying speeds. Prime mover 22 can be a self-contained power source, such as a gasoline-powered engine, or can be a motor, such as an electric or hydraulic motor, driven by a power source independently supported a distance away from the shear wave generator of this invention. Where the minimization of total equipment weight is desired, it is preferred that prime mover 22 be a self-contained power source. As illustrated in FIG. 2, prime mover 22 rotates eccentric 14 in a clockwise direction.

Body section 10 also includes a position sensor, indicated generally as 24, mounted on base plate 18. Position sensor 24 includes first sensor element 26 fixedly attached to and rotatable with axle 16 about axis A—A, second sensor element 28 fixedly attached to base plate 18 and supported by means of bracket 34 at a first critical position about axis A—A, and, optionally, third sensor element 30 fixedly attached to base plate 18 and supported by means of bracket 34 at a second critical position about axis A—A. As best seen in FIG. 2, sensor element 26 is an opaque disk having a long narrow actuator slot 32. Sensor elements 28 and 30 comprise light sources 28a and 30a, respectively, mounted on the inboard side of sensor element 26, and photocell pulse generators 28b and 30b, respectively mounted on the outboard side of sensor element 26. Sensor element 26 prevents the transmission of light from light sources 28a and 30a to pulse generators 28b and 30b, respectively, except for each brief instant that actuator slot 32 passes in close proximity to the respective sensor element 28 and 30, that is, actuator slot 32 allows a discrete pulse of light from light sources 28a and 30a through sensor element 26 to pulse generators 28b and 30b, respectively, at and only at the one instant during each revolution of eccentric 14 at which actuator slot 32 passes in close proximity to the respective sensor elements 28 and 30.

As illustrated in FIG. 2, actuator slot 32 is located about axis A—A in the same radial plane from axis A—A that passes through the center of mass of eccentric 14. Sensor element 28 is supported by bracket 34 at a position about axis A—A such that actuator slot 32 passes in close proximity to sensor element 28 once during each revolution of eccentric 14 at exactly the instant when the center of mass of eccentric 14 is in that angular position about axis A—A at which the apparatus develops the peak shear force during each revolution of eccentric 14. In the illustrated embodiment, the direction from outrigger section 12 to body section 10 has been selected as the "positive" shear direction and the peak shear force occurs when the center of mass of eccentric 14 is traveling parallel to the bottom of base plate 18 and toward outrigger section 12. Accordingly, sensor element 28 is mounted directly above axis A—A at a radial distance from axis A—A corresponding to the distance that slot 32 is spaced from axis A—A. Of course, as discussed above with respect to the definition of the peak shear force, if the "positive" shear direction is selected to be the direction from body section 10 to outrigger section 12, position sensor 28 would be mounted in a similar position but directly below axis A—A.

When it is desired to obtain both shear and pressure wave seismic data, sensor element 30 is employed in cooperation with sensor element 26 to generate a code signal with which to correlate the raw pressure wave data. Sensor element 30 is supported by bracket 34 at a position about axis A—A such that actuator slot 32 passes in close proximity to sensor element 30 once during each revolution of eccentric 14 at exactly the instant when the center of mass of eccentric 14 is in that angular position about axis A—A at which the apparatus develops the peak earthward force during each revolution of eccentric 14, i.e., in this embodiment when the center of mass of eccentric element is traveling perpendicular to and away from the lower surface of base plate 18. Accordingly, sensor element 30 is positioned in the same horizontal plane as axis A—A on the side of axis A—A farthest from outrigger section 12.

It should be understood of course that the exact angular position of sensor element 26 with respect to the center of mass of eccentric 14 and the angular positions of sensor elements 28 and 30 with respect to axis A—A are not critical as long as actuator slot 32 passes in close proximity to sensor elements 28 and 30 at the above-described critical times.

Figure 3:
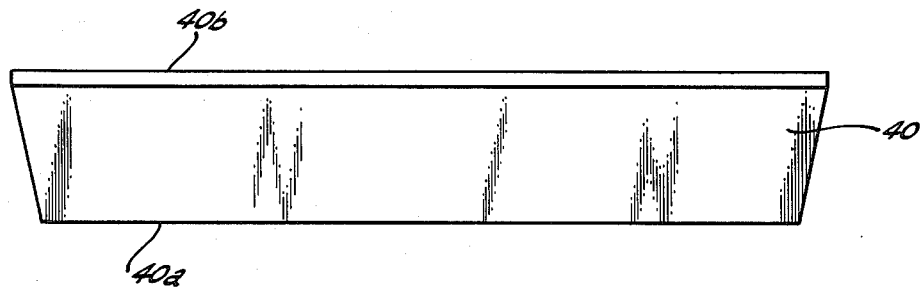
FIG. 3 is an elevational view of the coupling device of the shear wave generating apparatus illustrated in FIGS. 1 and 2.

Body section 10 can be allowed to decouple from the earth to generate multiple impulse pressure and shear waves, however body section 10 is preferably at least pivotally coupled to the earth, such as by means of outrigger section 12. Outrigger section 12 comprises a shovel element 40 mechanically coupled through coupling devices 42 (only one of which is shown) to one end of outrigger supporting rods 44 which are fixedly attached at their opposed second ends to base plate 18 by means of attachments 46. As illustrated in FIGS. 2 and 3, element 40 includes a substantially vertically extending end 40a adapted to be driven into the earth so as to couple the apparatus to the earth along the length of end 40a. Preferably, element 40 also has lip 40b adapted to facilitate the driving of end 40a into the earth. Coupling device 42 can be a fixed mechanical connection, such as a weld. Preferably, however, coupling device 42 is a pivoting device selected to allow some vertical movement of body section 10 without twisting element 40 while still transmitting shear waves developed by the apparatus to the earth via element 40. Ball and socket joints or simple hinges are exemplary pivotal devices.

Body section 10 can also be fully coupled to the earth by means of any conventional coupling device, such as holddown weights or anchors, not shown, alone or in combination with outrigger section 12 or the like.

In operation, prime mover 22 rotates axle 16 about axis A—A to thereby rotate eccentric 14 and sensor element 26 about axis A—A. When eccentric 14 has been rotated clockwise from the illustrated position until the flat face of eccentric 14 is perpendicular to the lower surface of base plate 18 and facing outrigger section 12, the center of mass of eccentric 14 will be traveling perpendicular to and away from the lower surface of base plate 18, and actuator slot 32 will be aligned with and in close proximity to sensor element 30. This is the angular position of eccentric 14 at the instant of peak earthward force during each revolution of eccentric 14, and light source 30a transmits light through slot 32 to thereby cause pulse generator 30b to emit a discrete electrical pulse representing the time break of the peak earthward force. When eccentric 14 has been rotated clockwise until the flat face of eccentric 14 is parallel to the lower surface of base plate 18 and facing base plate 18, the center of mass of eccentric 14 will be traveling parallel to the lower surface of base plate 18 and toward outrigger section 12 and actuator slot 32 will be aligned with and in close proximity to sensor element 28. This is the angular position of eccentric 14 at the instant of peak shear force during each revolution of eccentric 14, and light source 28a transmits light through slot 32 to thereby cause pulse generator 28b to emit a discrete electrical pulse representing the time break of the peak shear force. The magnitude of the peak shear force and the peak earthward force will increase as the rotational speed of eccentric 14 is increased and will decrease as its rotatonal speed is decreased.

The code signals generated by pulse generators 28b and 30b are preferably transmitted, such as by electrical conductors, not shown, or by radio signal to a recording device or other device for use in correlating the raw seismic data obtained.

In the method of this invention, a rotating eccentric weight seismic source of this invention is positioned at a sourcepoint on the earth surface and the rotatable eccentric and a first sensor element are rotated at varying speeds about an axis of rotation so as to transmit into the underlying earth strata a shear wave signal having a frequency variable code. When the source is fully or pivotally coupled to the earth, the shear wave signal will be a sinusoidal sweep signal, whereas if the source is caused to alternately decouple from and impact against the earth surface a multiple impulse shear wave signal will be transmitted. The source can be situated so as to butt against a vertical earth surface, such as the side of a hole, or a vertically extending abutment coupled to the earth to maximize the shear wave energy transmitted into the earth when the source is allowed to decouple.

A second sensor element is positioned at a selected position about the axis of rotation such that the first sensor element will pass in close proximity to the second sensor element at and only at the instant at which the center of mass of the rotating eccentric passes that angular position about its axis of rotation at which the source develops the peak shear force during each revolution of the rotating eccentric. One of the first or second sensor elements, preferably the second sensor element, is caused to generate a shear wave code signal characterized by a substantially interference-free background and a plurality of discrete pulses, each of which pulses corresponds to one of the instants at which said first sensor element passes in close proximity to said second sensor element.

Seismic shear wave energy returning from the underlying earth strata to a receiver location is sensed by means of a conventional shear wave seismometer, such as a single horizontally oriented geophone to detect horizontal shear waves or vertical shear waves, or, alternatively, a pair of orthogonally arranged horizontal geophones to detect both vertical and horizontal shear waves, so as to obtain raw shear wave data. The raw shear wave data is correlated with the shear wave code signal to thereby form a correlated shear wave trace indicative of the structure of the earth strata.

In one preferred embodiment of this invention, a rotating eccentric weight seismic source of the type illustrated in FIGS. 1–3 is employed to simultaneously transmit both a coded shear wave signal and a coded pressure wave signal into the earth. The source is positioned at a desired sourcepoint and the rotatable eccentric and a first sensor element are rotated at varying speeds about an axis of rotation so as to transmit both a pressure wave signal and a shear wave signal having frequency variable codes. Where the source is fully coupled to the earth, both the pressure wave signal and the shear wave signal will be sinusoidal sweep signals. Where the source is allowed to alternately decouple from and impact against the earth without any coupling, both the pressure wave signal and the shear wave signal will be multiple impulse signals. In a particularly preferred embodiment of this invention, the seismic source is only pivotally coupled to the earth as illustrated in FIG. 2 so that the shear wave signal generated by the rotating eccentric will be transmitted to the earth through outrigger section 12 as a sinusoidal sweep signal while eccentric 14 is rotated at speeds sufficient to alternately decouple body section 10 of the source from earth surface 50 and impact body section 10 against earth surface 50 so as to transmit a multiple impulse pressure wave signal into the earth.

When a pressure wave signal is transmitted, it is preferred that a second sensor element be positioned at a selected position about the axis of rotation such that the first sensor element passes in close proximity to the second sensor element at and only at the instant at which the center of mass of the rotating eccentric passes that angular position about its axis of rotation at which the source develops its peak shear force during each revolution of the rotating eccentric. Where the rotating first element is a pulse generator and the stationary second element is the actuator, a third sensor element comprised of a second pulse generator is rotated with the first sensor element and rotatable eccentric about the axis of rotation. The position of the third sensor element is selected in view of the positions of first and second sensor elements such that the third sensor element passes in close proximity to the stationary actuator at and only at the instant at which the center of mass of the rotating eccentric passes that angular position at which the peak earthward force is developed during each revolution of the rotating eccentric. Preferably, however, the rotating first sensor element is the actuator, the stationary second sensor element is a pulse generator and a third sensor element comprised of a second pulse generator is positioned at a selected position about the axis of rotation such that the rotating actuator passes in close proximity to the third sensor element at and only at the instant at which the center of mass of the rotating eccentric passes that angular position at which the peak earthward force is developed during each revolution of the rotating eccentric.

The two pulse generators are each caused to generate a code signal characterized by a substantially interference-free background and a plurality of discrete pulses. The pulses of the shear code signal generated by the first pulse generator (first or second sensor element) will each correspond to one of the instants at which the first sensor element passes in close proximity to the second sensor element, and the pulses of the pressure code signal generated by the third sensor element will each correspond to one of the instants at which the third sensor element is in close proximity to the cooperating one of the first or second sensor elements.

Seismic shear wave and pressure wave energy returning from the earth strata to a receiver location is sensed by means of conventional multiaxial seismometers, such as one vertically oriented geophone and one or two horizontally oriented geophones, so as to obtain raw shear wave data and raw pressure wave data. The raw shear wave data is correlated with the shear code signal to form a correlated shear wave trace, and the raw pressure wave data is preferably correlated with the pressure wave code signal to thereby form a correlated pressure wave trace.

The correlation technique employed can be the conventional integration method [cf. Sheriff, R. E., *Encyclopedic Dictionary of Exploration Geophysics*, Society of Exploration Geophysicists, Tulsa, Okla., 1973] or can be the type of correlation method disclosed in U.S. Pat. No. 3,698,009 to Barbier, which method is herein termed the "shift-summing" method of correlation. When the seismic signal transmitted into the earth is a sinusoidal signal, the integration method of correlation is preferred. On the other hand the shift-summing method is particularly well suited to the method of this invention when a multiple impulse signal is transmitted into the earth. The correlation step can be performed in real time, i.e., the data can be automatically correlated as it is being received, or the raw data and the code signal can be recorded and processed at a later time either in a computer located on site or a computer located elsewhere.

The pulses of the code signals generated by the position sensors of this invention indicate the exact time break of each occurrence of the peak shear force or the peak earthward force. Where the coded energy signal transmitted is an impulse train, the code signal can be used directly to correlate the raw seismic data. Although not usually required, the code signal can be "shaped" by making each pulse the same amplitude and breadth prior to integration with the raw seismic data. In the shift-summing method of correlation, of course, only the time break of each pulse is used, not its amplitude. If the coded energy signal transmitted is a sinusoidal signal, then the code signal may be modified to resemble a sinusoidal function by modeling a facsimile signal having the same frequency as the pulses of the code signal and an amplitude which is calculated from the speed of rotation of the rotating eccentric. This modification of the code signal to form a facsimile signal is within the skill of the art.

The raw seismic data obtained can be processed and/or recorded in analog or digital form. As a practical matter, computer processing is required to correlate the raw data and accordingly the raw seismic data is preferably converted to a plurality of digitized samples. These digitized samples contain either the polarity and the amplitude of the raw seismic data, or, in the case of "sign-bit" samples, contain only the polarity of the sample. The processing of "sign-bit only" data is known, for example U.S. Pat. No. 4,058,791 to Martin et al. discloses the use of "sign-bit only" data throughout the correlation and stacking phases of the data processing method.

The use of "sign-bit only" recording and data processing is especially well suited to the method of this invention where the impulses of the coded energy signal transmitted into the ground have low and/or irregular seismic energies, because the sign-bit only processing places greater emphasis on the number of impulses transmitted from each sourcepoint, rather than the magnitude and uniformity of the impulsive energy.

The method of this invention can be employed in any onshore location, it is however particularly useful in exploration of relatively inaccessible regions wherein the prior art methods employing slave-type source are precluded due to the weight of the required equipment. The various steps and preferred equipment of the method of this invention combine to significantly reduce the weight of the equipment required.

The weight of the seismic source required is reduced, as compared to the prior art systems, because: (1) the use of a master-type decoupling source eliminates the need for heavy source control equipment; (2) by the preferred method of processing and/or recording only the sign-bit of the sensed energy, the force magnitude of the individual impulses is less important than the number of impulses transmitted; and (3) while prior art multiple impulse methods, in which the sensed energy was automatically shift-summed as it is recorded, require seismic sources which transmit substantially identical impulses, the preferred processing of only the sign-bit in the method of this invention makes it possible to employ even the variable-force seismic sources of this invention, such as the devices illustrated in FIG. 1 which are generally less sophisticated and lighter weight.

The weight of the requiring sampling and recording equipment for use in the method of this invention is less than that of the high quality prior art equipment, because: (1) fewer memory positions are required since the seismic data is automatically shift-summed; and (2) since preferably only the sign-bit is sampled, shift-summed and recorded, a less sophisticated sampling device, smaller capacity memory positions and less sophisticated computational capacity are required.

Furthermore, these weight reductions are not achieved at the expense of seismic data quality. Due to the precise record of the impulse time breaks emitted by the position sensors of this invention, the raw seismic data is more accurately correlated, consequently the correlated trace obtained is superior in quality to a trace obtained by correlating the raw seismic data according to the attenuated output signals emitted by the prior art acoustic sensors. In the correlation step, the amplitude of the seismic events on the correlated trace is effectively rebuilt by the shift-summing of the sign-bit samples as the randomly oriented background noise is effectively cancelled and the energy due to seismic events adds in phase.

The coded energy signals which can be transmitted into the earth using a decoupling eccentric weight seismic source comprise a plurality of impulses separated by discrete time intervals. Since the speed of the rotating eccentric cannot be changed instantaneously from one speed to another, the time intervals between successive impulses necessarily define an ascending pattern, a descending pattern, a constant pattern or a combination of these patterns. The frequency of the impulses can vary between about 0.5 and about 150 impulses per second and more preferably between about 5 and about 75 impulses per second. The minimum time interval between successive impulses should be at least about 10 milliseconds and preferably at least about 15 milliseconds in order to avoid overlap and therefore distortion of the outgoing coded energy signal. The number of impulses in a single coded energy signal can vary from about 10 to about 400 or more. Preferably the coded energy signal consists of a ramp of either steadily increasing or alternatively steadily decreasing frequency, although other codes may be successfully employed. The coded energy signals vary between about 1 and about 20 seconds in length. The preferred coded energy signals are those whose auto-correlation function [cf. Sheriff, R. E., op.cit.] has a central, largest absolute amplitude to next-largest absolute amplitude maximum ratio of at least about 3. This ratio is preferably at least about 10 and more preferably at least about 20. This ratio can be controlled by proper selection of the pattern of time intervals between impulses as disclosed in U.S. Pat. Nos. 3,622,970 to Sayous et al., 3,698,009 to Barbier; and 3,326,320 to Forester.

In another preferred embodiment of the method of this invention, the seismic source of this invention is employed to separately transmit a plurality of differently coded energy signals into the earth from the same sourcepoint. A corresponding plurality of code signals are generated by the position sensor. The raw seismic data detected at each geophone location is then correlated with the corresponding code signal to produce a plurality of correlated traces, each of which corresponds to one of the coded energy signals. The correlated traces are then vertically stacked to form a stacked trace. The use of differently coded energy signals serves to attenuate undesirable correlation residuals, thereby effectively improving the resolution of the stacked trace.

In a particularly preferred embodiment of the method of this invention, multiple coverage of a section of earth strata is obtained by separately transmitting a plurality of differently coded impulse trains, such as from 10 to 20 impulse trains, into the earth from a single sourcepoint. The sensor will generate a corresponding plurality of code signals, a plurality of raw seismic data signals will be generated by the geophones or other energy sensing device, and sign-bit samples extracted from the raw signals will be automatically shift-summed in response to the corresponding code signal. The shift-summed samples are then added to the previously recorded shift-summed samples for the same receiver location. A vertically stacked shift-summed trace is thereby automatically obtained in real time, eliminating the need to separately record each of the shift-summed tracers before vertically stacking them. The use of differently coded impulse trains results in smaller correlation residuals than repeated use of a single code.

The correlated and/or vertically stacked correlated traces obtained in the method of this invention can be further processed by conventional seismic data processing methods which are well known in the art. Such methods include: common depth point stacking, moveout corrections, frequency filtering, and correlation residual reduction processing, such as the predictive subtraction deconvolution processing disclosed in U.S. Pat. No. 4,223,399 to Hackett.

The use of the position sensors of this invention results in substantially superior resolution in the processed correlated traces obtained due to the much more precise record of the code of the transmitted signals obtained with these position sensors as compared to the known acoustic sensors. Reference is made to the Example and FIGS. 6A–6D of U.S. Pat. No. 4,143,737 for a direct comparison of the code signals generated by a magnetic position sensor of this invention to the code signal generated by acoustic sensors under the same conditions.

While particular embodiments of the invention have been described, it will be understood, of course, that the invention is not limited thereto since many obvious modifications can be made, and it is intended to include within this invention any such modifications as will fall within the scope of the claims.

Having now described the invention, I claim:

1. A method for the seismic exploration of earth strata underlying an earth surface between a sourcepoint and a receiver location, which comprises:
   (a) positioning on said earth surface at said sourcepoint a seismic source having (1) an eccentric element which is rotatable about an axis of rotation and (2) a position sensor comprised of a first sensor element and a second sensor element;
   (b) rotating said eccentric element and said first sensor element about said axis of rotation at varying speeds so as to transmit into said earth strata a shear wave signal having a frequency variable code;
   (c) positioning said second sensor element at a first selected position about said axis of rotation such that said first sensor element passes in close proximity to said second sensor element at and only at the instant at which the center of mass of said eccentric element passes that angular position about said axis of rotation at which said seismic source develops the peak shear force during each revolution of said eccentric element;
   (d) causing one of said first or second sensor elements to generate a shear code signal characterized by a substantially interference-free background and a plurality of discrete pulses, each of said pulses corresponding to one of the instants at which said first sensor element passes in close proximity to said second sensor element;
   (e) sensing seismic shear wave energy returning from said earth strata to said receiver location in order to obtain raw shear wave data which is proportional to said seismic energy; and
   (f) correlating said raw shear wave data with said shear code signal to thereby form a correlated shear wave trace which is indicative of the structure of said earth strata.

2. The method defined in claim 1 wherein during step (b) said eccentric element is rotated at varying speeds sufficient to cause said seismic source to alternately decouple from and impact against a vertical abutment coupled to the earth once during each revolution of said eccentric element whereby the coded shear wave signal transmitted into said earth strata during step (b) comprises a plurality of shear wave impulses separated by varying discrete time intervals.

3. The method defined in claim 1 wherein said seismic source is fully coupled to said earth surface at said sourcepoint such that the coded shear wave signal transmitted into said earth strata during step (b) comprises a variable-frequency sinusoidal shear wave signal.

4. The method defined in claim 1 wherein said seismic source is pivotally coupled to said earth surface by a pivotal coupling device so as to transmit a sinusoidal coded shear wave signal through said coupling device into said earth strata.

5. The method defined in claim 1, 2, 3 or 4 wherein during step (b) said eccentric element is rotated about said axis of rotation at varying speeds so as to simultaneously transmit both said coded shear wave signal and a coded pressure wave signal into said earth strata, and wherein said method further comprises the steps of (g) sensing seismic pressure wave energy returning from said earth strata to said receiver location to obtain raw pressure wave data, and (h) correlating said raw pressure wave data with a selected code signal indicative of the time breaks of the peak earthward force developed during each revolution of said eccentric element to thereby form a correlated pressure wave trace.

6. The method defined in claim 5 wherein said position sensor includes a third sensor element; wherein said method further comprises the steps of positioning said third sensor element at a second selected position about said axis of rotation such that said first sensor element passes in close proximity to said third sensor element at and only the instant at which the center of mass of said eccentric element passes that angular position about said axis of rotation at which said seismic source develops the peak earthward force during each revolution of said eccentric element, and causing said third sensor element to generate a pressure code signal characterized by a substantially interference-free background and a plurality of discrete pulses, each of which pulses corresponds to one of the instants at which said first sensor element passes in close proximity to said third sensor element; and wherein said pressure code signal is used as said selected code signal in step (h) to correlate said raw pressure wave data.

7. The method defined in claim 1, 2, 3 or 4 wherein the rotational speed of said eccentric element is varied in a preselected manner between 0.5 and 150 revolutions per second such that the autocorrelation function of the corresponding code signal generated in step (d) has a ratio of its largest to next-largest absolute maxima of at least 3.

8. The method defined in claim 1, 2, 3 or 4 wherein said steps (b) through (f) are repeated a plurality of times such that a plurality of said coded shear wave signals, each having a different frequency variable code, are separately transmitted into said earth strata from said sourcepoint and a corresponding plurality of said correlated shear wave traces are obtained; and wherein said method further comprises the step of vertically stacking said plurality of correlated shear wave traces to form a stacked shear wave trace.

9. A method for the seismic exploration of earth strata underlying an earth surface between a sourcepoint and a receiver location, which comprises:
(a) positioning on said earth surface at said sourcepoint a seismic source having (1) a body section comprising a base plate, an eccentric element rotatably supported above said base plate so as to be rotatable about an axis of rotation substantially perpendicular to an imaginary line between said sourcepoint and said receiver location, and a position sensor comprised of first, second and third sensor element, and (2) an outrigger section pivotally coupling said body section to said earth surface along a pivotal line parallel to said axis of rotation and spaced from said body section;
(b) rotating said eccentric element and said first sensor element about said axis of rotation at varying speeds between 0.5 and 150 revolutions per second so as to simultaneously transmit a coded pressure wave signal through said base plate into said earth strata and a sinusoidal coded shear wave signal through said outrigger section into said earth strata;
(c) positioning said second sensor element at a first selected position about said axis of rotation such that said first sensor element passes in close proximity to said second sensor element at and only at the instant at which the center of mass of said eccentric element passes that angular position about said axis of rotation at which said seismic source develops the peak shear force during each revolution of said eccentric element, and positioning said third sensor element at a second selected position about said axis of rotation such that said first sensor element passes in close proximity to said third sensor element at and only at the instant at which the center of mass of said eccentric element passes that angular position about said axis of rotation at which said seismic source develops the peak earthward force during each revolution of said eccentric element;
(d) causing said second sensor element to generate a shear code signal characterized by a substantially interference-free background and a plurality of discrete pulses, each of said pulses indicating the time break of one of the instants at which said first sensor element passes in close proximity to said second sensor element, and causing said third sensor element to generate a pressure code signal characterized by a substantially interference-free background and a plurality of discrete pulses, each of said pulses indicating the time break of one of the instants at which said first sensor element passes in close proximity to said third sensor element;
(e) sensing seismic shear wave energy and seismic pressure wave energy returning from said earth strata to said receiver location so as to obtain raw shear wave data and raw pressure wave data; and
(f) correlating said raw shear wave data with said shear code signal to thereby form a correlated shear wave trace indicative of the structure of said earth strata and correlating said raw pressure wave data with said pressure code signal to thereby form a correlated pressure wave trace indicative of the structure of said earth strata.

10. The method defined in claim 9 wherein said body section of said seismic source is fully coupled to the earth such that the coded pressure wave signal transmitted into said earth strata during step (b) is a sinusoidal pressure wave signal.

11. The method defined in claim 9 wherein during step (b) said eccentric element is rotated at speeds sufficient to cause said body secton to alternately decouple from and impact against said earth surface once during each revolution of said eccentric element such that the coded pressure wave signal transmitted into said earth strata comprises between 10 and 400 impulses separated by varying discrete time intervals.

12. The method defined in claim 9, 10 or 11 further comprising the steps of (g) repeating said steps (b) through (f) a plurality of times such that a corresponding plurality of said coded shear wave signals and said coded pressure wave signals, each having a different frequency-variable code, are separately transmitted into said earth strata from said sourcepoint and a corresponding plurality of correlated shear wave traces and correlated pressure wave traces are formed, and (h) vertically stacking said correlated shear wave traces to form a stacked shear wave trace and vertically stacking said correlated pressure wave traces to form a stacked pressure wave trace.

* * * * *